United States Patent
Summerlin

(10) Patent No.: US 7,273,338 B2
(45) Date of Patent: Sep. 25, 2007

(54) BLIND RIVET AND METHOD OF ASSEMBLY

(75) Inventor: Frederick Arthur Summerlin, Berkshire (GB)

(73) Assignee: Milladale Limited (GB)

( * ) Notice: Subject to any disclaimer, the term of this patent is extended or adjusted under 35 U.S.C. 154(b) by 73 days.

(21) Appl. No.: 11/142,238

(22) Filed: Jun. 2, 2005

(65) Prior Publication Data

US 2005/0214094 A1 Sep. 29, 2005

Related U.S. Application Data

(63) Continuation of application No. 10/470,006, filed as application No. PCT/GB02/00304 on Jan. 22, 2002, now abandoned.

(30) Foreign Application Priority Data

Jan. 23, 2001 (GB) ................................. 0101747.4

(51) Int. Cl.
*F16B 13/06* (2006.01)
(52) U.S. Cl. ...................... 411/501; 411/70; 29/525.06
(58) Field of Classification Search ................ 411/501, 411/34, 70; 29/525.06, 525.05, 426.4
See application file for complete search history.

(56) References Cited

U.S. PATENT DOCUMENTS

| | | | |
|---|---|---|---|
| 1,996,128 A * | 4/1935 | Thomson | ..................... 411/27 |
| 2,366,510 A | 1/1945 | Frank | |
| 2,369,670 A | 2/1945 | Gookin | |
| 2,465,144 A * | 3/1949 | Wyatt | ........................... 29/816 |
| 3,286,580 A | 11/1966 | Harvey | |
| 3,555,673 A | 1/1971 | Summerlin | |
| 3,698,278 A * | 10/1972 | Trembley | .................... 411/34 |
| 4,497,603 A | 2/1985 | Boucher et al. | |
| 4,642,010 A | 2/1987 | Bradley et al. | |
| 4,847,963 A * | 7/1989 | Bendoraitas et al. | ....... 29/888.1 |
| 5,286,151 A | 2/1994 | Eshraghi | |
| 5,919,016 A * | 7/1999 | Smith et al. | ................... 411/34 |
| 6,081,984 A | 7/2000 | Sherry | |
| 6,186,717 B1 | 2/2001 | Cosenza | |
| 6,224,310 B1 | 5/2001 | Summerlin et al. | |
| 6,494,652 B1 | 12/2002 | Summerlin | |

* cited by examiner

*Primary Examiner*—Flemming Saether
(74) *Attorney, Agent, or Firm*—Miles & Stockbridge P.C.; Edward J. Kondracki

(57) ABSTRACT

A blind rivet and a method of assembly comprising a tubular shell and mandrel in combination. The mandrel comprises a stem and a radially-enlarged head which in use forms a blind head to the shell to set the rivet, in which either the head of the mandrel or the bore of the shell is formed with a plurality of depressions the bases of which lie on a notional circle having a diameter which, where the depressions are formed in the head of the mandrel, is less than the bore of the shell or, where the depressions are formed in the bore of the shell, is greater than the diameter of the head of the mandrel. The depressions, which are preferably generally longitudinally disposed, define ribs, ridges or other protusions therebetween which in use and on pulling the mandrel into the shell bore extend radially beyond the bore of the shell, so that material of the shell becomes displaced by contact with the ridges and occupies the depressions. The invention may be applied either to pull-through, or self-plugging rivets.

7 Claims, 4 Drawing Sheets

BLIND RIVET AND METHOD OF ASSEMBLY

This is a continuation application of application Ser. No. 10/470,006 filed Dec. 5, 2003, now abandoned corresponding from International Application No. PCT/GB02/00304 filed Jan. 22, 2002 (International Publication No. WO 02/059489 A1), corresponding from Great Britain Application No. 0101747.4 filed Jan. 23, 2001. Reference is hereby made to Great Britain Patent Application No. 0101747.4 filed Jan. 23, 2001, the benefit of priority of the filing date of which is claimed herein.

This invention relates to a blind rivet. A blind rivet is one that can be inserted and set by access to one side only of apertured members to be riveted together.

Blind rivets are either of the pull-though type or of the self-plugging type. In both types, the rivet comprises a tubular shell having a preformed radial head at one end; the shell is threaded on a mandrel which has a head adjacent to the tail end of the shell. In use, the shell is inserted, tail end first, through the apertures in the members to be riveted until the shell head contacts the nearer member and the shell tail protrudes beyond the further member. In order to set the rivet, the shell is supported by an abutment and the mandrel is then pulled through the shell bore so as to form a blind head which together with the preformed head clamps the members together and also expands the shank of the rivet. With pull-though rivets, the mandrel is pulled completely through the bore and can be re-used with another shell, whereas with self-plugging rivets the stem of the mandrel is provided with a narrowed neck portion known as a breakneck which defines the position where the mandrel breaks under tension applied by the setting tool when the blind head is formed, leaving the head and remote part of the stem in place in the set rivet.

Rivets of the pull-though type are well known and a particular design is described in UK patent 1323873 whereas the rivets of the self-plugging type are described in UK patent number 2330639.

Hitherto, the performance of pull through rivets has been markedly inferior to that of self-plugging or break stem rivets. It is the purpose of the present invention to provide a riveting system which shows distinct advantages over existing systems in complexity, cost, and performance. In addition the safety especially of pull through repetition riveting systems in which rivet shells are threaded on a long mandrel is a serious problem since if the mandrel breaks under the setting loads it may be projected from the partially placed rivet at high speed. It is a further object of the present invention to provide a method of placing rivets, especially repetition rivets, in which projection of a part of the mandrel in the case of mandrel breakage is inhibited. It is also, however, an object to provide a higher-performance self-plugging rivet.

In one aspect, the present invention provides a blind rivet comprising a tubular shell and mandrel in combination, the mandrel comprising a stem and a radially-enlarged head which in use forms a blind head to the shell to set the rivet, in which either the head of the mandrel or the bore of the shell is formed with a plurality of depressions the bases of which lie on a notional circle having a diameter which, where the depressions are formed in the head of the mandrel, is less than the bore of the shell or, where the depressions are formed in the bore of the shell, is greater than the diameter of the head of the mandrel.

Preferably, the depressions are formed in the head of the mandrel and the bore of the shell is a plain cylinder. The depressions, which are preferably generally longitudinally disposed, that is, have a major component parallel with the axis of the rivet, define ribs, ridges or other protrusions therebetween which in use and on pulling the mandrel into the shell bore extend radially beyond the bore of the shell, so that material of the shell can be displaced by contact with the ridges and occupies the depressions. The material of the mandrel, or at least the head thereof, is preferably harder than the material of the shell.

To permit the head of the mandrel to enter the bore of the shell, the leading edge of the ridges may be provided with a chamfer to form an annular angled segmented shoulder between the stem and head of the mandrel.

For pull-through rivets according to the present invention, the stem of the mandrel is a plain cylinder whereas for self-plugging rivets the stem of the mandrel is provided with a breakneck adjacent the radially-enlarged head.

In use, when the mandrel head is drawn through the shell bore, the head initially expands the tail of the shell to form a blind head which clamps the apertured members together with out substantially distorting the bore of the shell. However, when the head of the mandrel begins to enter that part of the shell bore which is within the apertured members being fastened, the ribs, ridges or other protrusions defined by the depressions in the mandrel head displace material from the rivet shell into the depressions as well as expanding the shell radially, thereby ensuring that the shell shank effectively fills the hole in the apertured members. It is necessary that the depressions have sufficient volume to accommodate the material displaced from the shell by the ridges and this determines the diameter of the circle through the base of the depressions.

Since as the mandrel is drawn into the rivet bore the depressions in the stem become filled with shell material, the mandrel is positively prevented from being pushed out and thus if the mandrel breaks during the setting process a dangerous incident is prevented.

In a conventional pull through riveting system, the diameter of the bore of a set rivet is equal to the diameter of the head of the mandrel. In the present invention and although the major diameter of the bore of the set rivet is determined by the major diameter of the mandrel head, the depressions in the mandrel head result in radial protections into the bore which substantially increase the strength of the set rivet. A further aspect of the invention is that of providing a set rivet which carries projections in the rivet bore.

In a conventional self-plugging riveting system, the head and remote stem end of the mandrel remain in place in the set rivet and, except for some slight embedding, the head of the mandrel does not enter the shell bore of the fully-set rivet. In the present invention, the head of the mandrel initially enters the shell bore in the tail end region thereof to form the blind head and thereafter enters that part of the bore within the apertured members to be fastened together, in the same way as with the pull through rivet. However, in this case the bore of the nose of the placing tool is a close fit on the mandrel so that, when the head of the mandrel contacts the nose of the placing tool, the tension in the stem of the mandrel is increased and the stem breaks at the breakneck, thus resulting in the bore of the rivet shank being filled with the head of the mandrel retained therein. The displacement of shell material into the depressions in the head of the mandrel results in the shell and mandrel head being locked together and a stronger set rivet once the stem has fractured.

In blind rivets according to the invention, the depressions are preferably in the form of grooves or channels and are preferably oriented substantially parallel with the longitudinal axis of the mandrel. However, the grooves or channels may be skewed in a frusto-helical disposition whereby on application of setting forces there is a tendency for the mandrel to twist about its longitudinal axis as the head thereof engages the bore of the shell. This may be of particular advantage with a rivet of the self-plugging type where stem fracture would occur on a combination of tension and shear forces applied as between the near or proximal end of the stem and the remote or distal end adjacent the head.

Embodiments of the invention will now be described by way of example and with reference to the accompanying drawings in which:—

Figure 1:
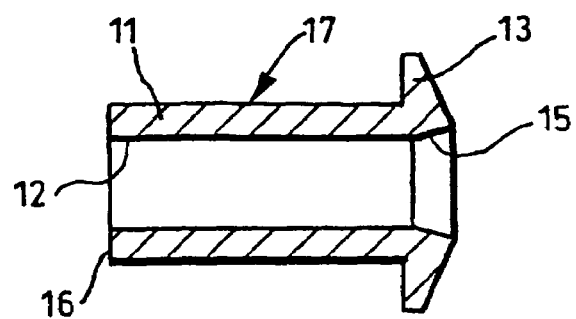
FIG. 1 is a longitudinal section through the shell of a pull-through rivet.

Referring first to FIG. 1, the shell 17 comprises a tubular body 11 having a concentric bore 12 and at one end a radially enlarged head 13 which carries a recess 15. The tail end 16 of the shell is flat and at right angles to the shell axis.

Figure 2:
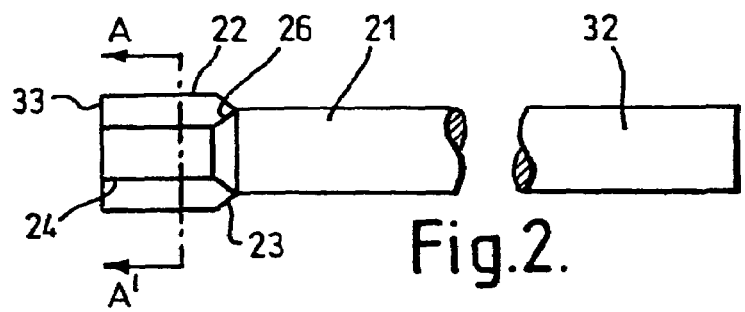
FIG. 2 is a side elevation of a mandrel for use with the shell of FIG. 1.

The mandrel shown in FIG. 2 is elongate and generally cylindrical. At one end it has a radially enlarged head 22 which is an integral part of the mandrel and is joined to the shank of the mandrel 21 by tapered portion 23. The shank has an end part 32 remote from the head for gripping by a placing tool, as described later. The shank of the mandrel is preferably sufficiently long so that a plurality of rivet shells can be threaded on it and fitted to a rivet placing tool which is arranged to feed rivet shells sequentially to the head end of the mandrel as the previous rivet shell is placed in the sheets to be riveted together. This type of tool is well known and will not be described further. The head of the mandrel carries recesses 24 the diameter of the root circle of which is less than the diameter of shank 21 and the outer surface of the head comprises ribs 33. Recesses 24 terminate at their end adjacent to the mandrel shank in an internal taper 26 which is complementary to the external taper so that the overall cross section of the mandrel is substantially constant. In the Figures, four ribs and corresponding recesses are shown. In practice this is probably the minimum number of ribs which can be used but a greater number of ribs may be used for larger diameter rivets. The shank of the mandrel 21 is a close fit in the bore 12 of the rivet 17.

Figure 3:
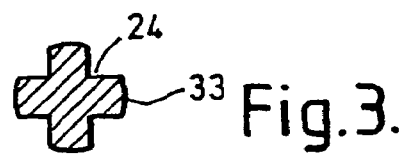
FIG. 3 is a section of the line A-A' of FIG. 2.

FIG. 3 shows a cross section of the mandrel head.

Figure 4:
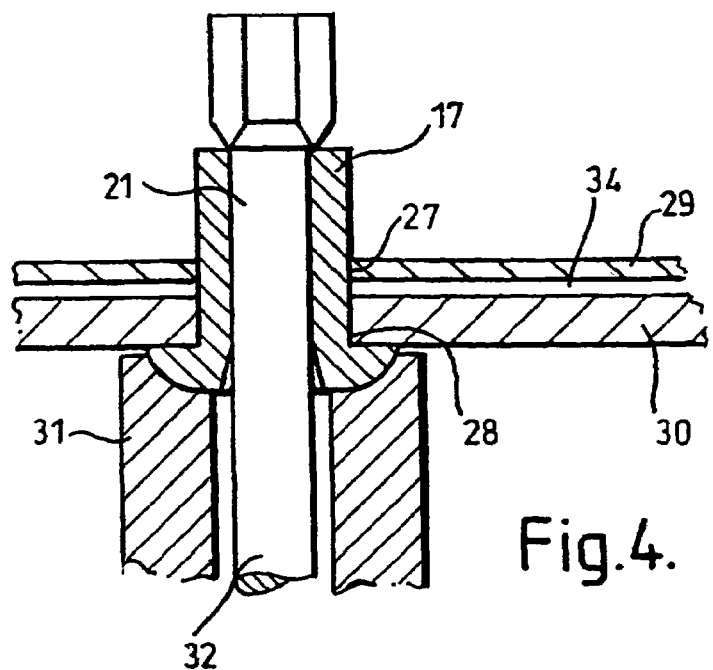
FIG. 4 shows the rivet assembled on a mandrel and inserted in sheets to be riveted together.

FIG. 4 shows the rivet shell 17 threaded on the mandrel shank 21 and inserted in the holes 27 and 28 in sheets 29 and 30 respectively. The rivet head is supported on the nose of a suitable placing tool 31 which is arranged to pull the stem part 32 relative to the rivet body to set the rivet.

Figure 5:
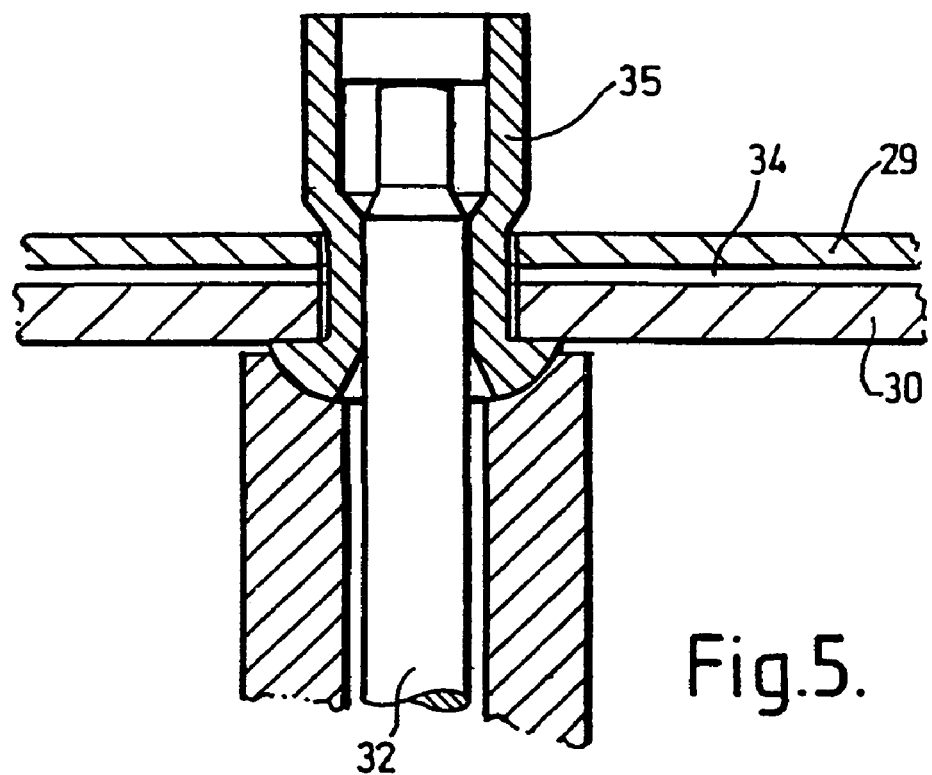
FIG. 5 shows the initial stage of setting the rivet.

In FIG. 5 the mandrel 32 has been pulled into the tail of the rivet expanding it and forming a blind head 35 and beginning to draw sheets 29 and 20 together and closing the gap 34 between the sheets.

Figure 6:
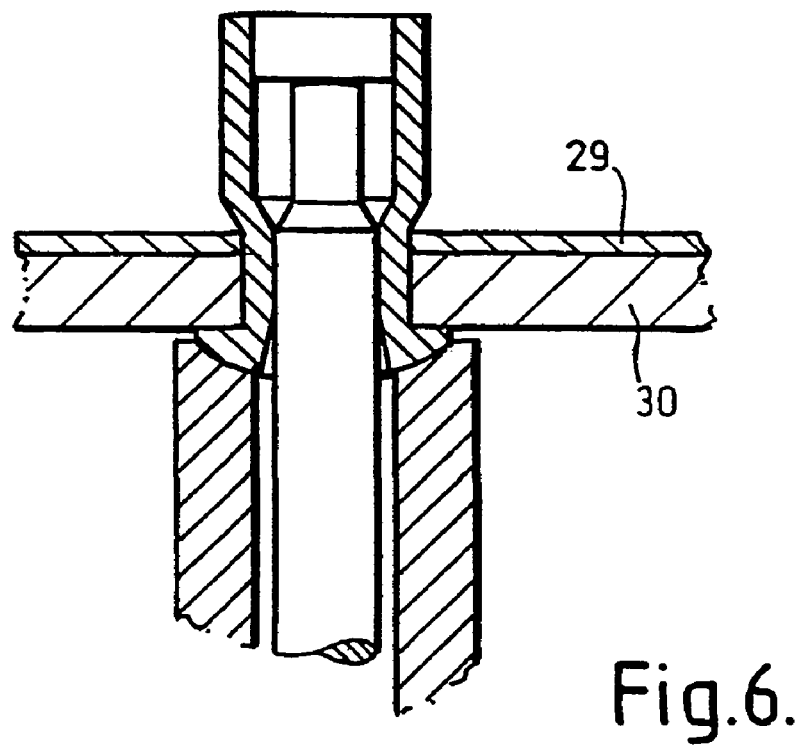
FIG. 6 shows the blind head fully formed.

FIG. 6 shows the blind head fully formed and sheets 29 and 30 pulled together closing gap 34.

Figure 7:
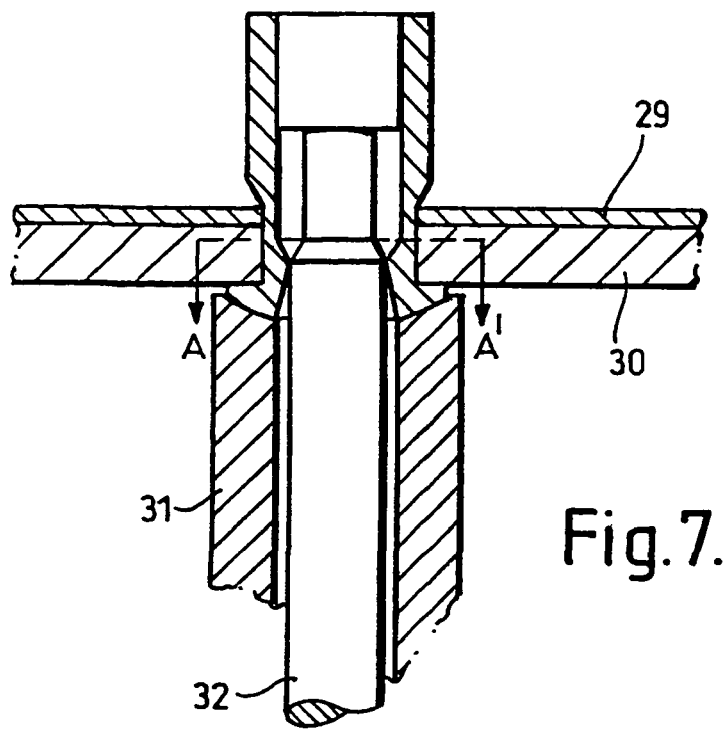
FIG. 7 shows the mandrel partially drawn through the rivet bore.

In FIG. 7 the mandrel is entering the rivet bore between sheets 29 and 30. The rivet shank has been expanded to fill the holes in the sheets and the excess material displaced by ribs 33 is accommodated in recesses 24 reducing the force required to set the rivet and minimising the elongation of the rivet shank which would tend to loosen the joint.

Figure 8:
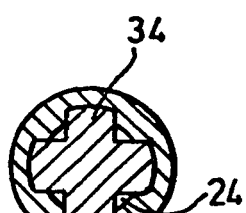
FIG. 8 is a section through the shank of the rivet of FIG. 7.

FIG. 8 is a cross section of the partially set rivet of FIG. 7.

Figure 9:
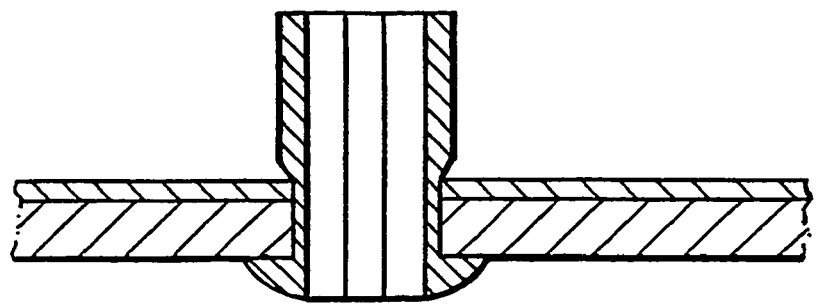
FIG. 9 shows the rivet fully set.

FIG. 9 shows the rivet fully placed. In this type of rivet some shell material may be dragged through the rivet bore and this material is accommodated in the recess 15 of the rivet shell.

Figure 10:
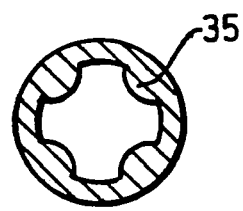
FIG. 10 is a section through the shank of the set rivet.

FIG. 10 is a cross section through the shank of the placed rivet of FIG. 9 showing the projections 35 in the rivet bore which enhance the shear strength of the rivet.

Figure 11:
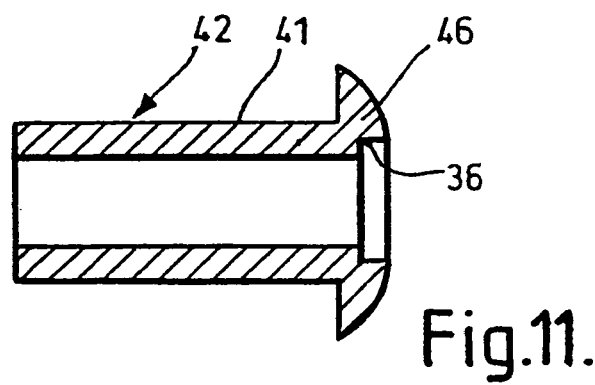
FIG. 11 is a longitudinal section through the shell suitable for a self-plugging rivet.

Referring to FIG. 11, a cross section of a rivet shell 42 suitable for use in a self plugging rivet is shown. The shell consists of a shank 41 and a head 46 and differs from the shell shown in FIG. 1 in that the recess 15 of FIG. 1 has been changed to the shape shown at 36 to conform to the shape of the nosepiece of a placing tool.

Figure 12:
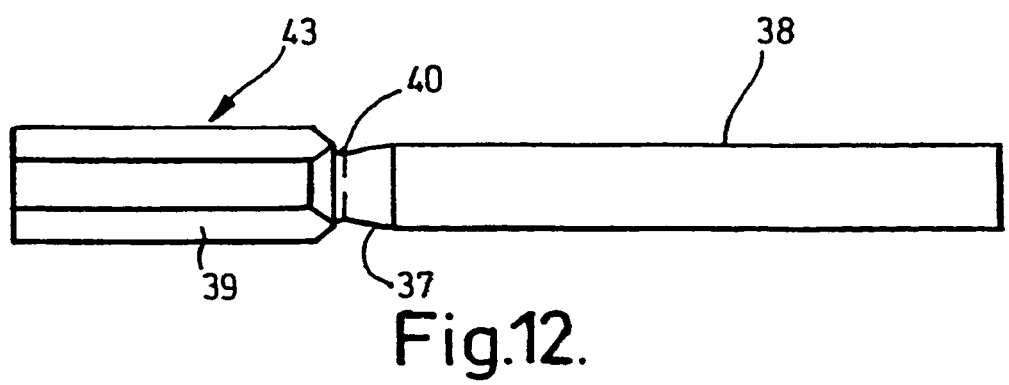
FIG. 12 is a side elevation of a mandrel for a self-plugging rivet.

FIG. 12 shows the mandrel 43 for a self plugging rivet. This carries a breakneck 37 at the junction 40 of the pintail 38 and the head 39. The cross section of the head is similar to the head of a pull through rivet mandrel as shown in FIG. 3 but the length of the head 39 is substantially equal to the length of the shank of the rivet shell 41.

Figure 13:
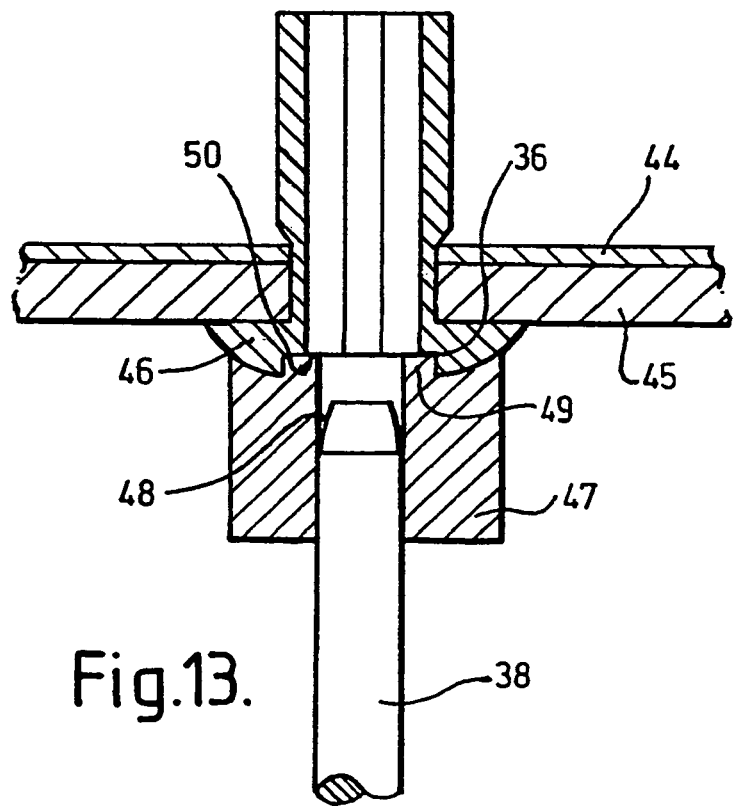
FIG. 13 is a section through a self-plugging rivet which has been set.

FIG. 13 shows a placed self plugging rivet. The shell 42 has been threaded on the mandrel 43 and inserted through sheets 44 and 45. The head of the rivet 46 is supported by the nose 47 of a placing tool. The bore 48 of the nose is a close fit on the pintail 38 of the rivet stem. A projection 49 on the front of the nose 47 is a close fit in the recess 36 in the head of the rivet.

In operation, the pintail 38 is pulled by operation of the placing tool relative to the nose 47. The formation of the tail of the rivet and expansion of the shank between the sheets is identical to that of the pull through rivet previously described but when the placing sequence is complete the shoulders 50 of the mandrel head 39 adjacent to the breakneck are arrested by the projection 49 on the nose of the placing tool 47 and the pintail breaks at the breakneck 40. Thus the rivet shell is fully plugged throughout its length and the mandrel break is substantially flush with the head of the rivet.

It should be noted that this rivet has a grip range i.e. the range of sheet thicknesses that can be joined together for which the upper limit is determined only by the length of the rivet shell. Obviously it is not desirable that the rivet shell should be excessively long because of the disadvantages of excessive weight and useage of raw material.

The invention claimed is:

1. A blind rivet comprising a tubular shell and mandrel in combination, the tubular shell having a single bore of substantially uniform diameter and a pre-formed radial head, the mandrel comprising a stem having an outer diameter substantially equal to the diameter of the bore, and a radially-enlarged head which in use forms a blind head to the shell to set the rivet, in which the head of the mandrel is formed with a plurality of depressions the bases of which lie on a notional circle having a diameter which is less than the stem of the mandrel and which define protrusions which extend radially beyond the bore of the shell, the protrusions being defining a maximum outer diameter of the head which is adapted to be drawn through the shell to, both deform the tubular shell to form the blind head and displace material from the shell into the depressions.

2. A blind rivet according to claim 1, in which the depressions are generally longitudinally disposed and have a major component parallel with the axis of the rivet.

3. A blind rivet according to claim 1 or 2, in which the material of the mandrel, or at least the head thereof, is harder than the material of the shell.

4. A blind rivet according to claim 3, in which the leading edge of the protrusions is provided with a chamfer to form an annular angled segmented shoulder between the stem and head of the mandrel.

5. A blind rivet according to claim 3, which has been set whereby the bore of the shell carries radial projections formed by passage therethrough of the head of the mandrel.

6. A method of setting a blind rivet in apertured members, the method comprising the steps of applying through the apertures a rivet tubular shell having a single bore of substantially uniform diameter and a pre-formed radial head so that the head is adjacent one of said members and drawing through the shell a mandrel comprising a stem having an outer diameter substantially equal to the diameter of the bore, and a radially-enlarged head to form a blind head to the shell adjacent the other of said members, in which the head of the mandrel is formed with a plurality of depressions defining protrusions providing a maximum out diameter of the head and the bases of which lie on a notional circle having a diameter which is less than the stem of the mandrel and which extend radially beyond the bore of the shell, whereby, on drawing the mandrel through the shell, the protrusions both deform the shell to form the blind head and displace material from the shell to occupy the depressions.

7. A riveting system for clamping adjacent, apertured members comprising a blind rivet for joining the members when the rivet is set, a mandrel for setting the rivet, the rivet comprising a tubular shell having a through central bore circular in cross section throughout its length and a head at one end of the shell, the head adapted to be placed against one of the apertured members with the shell extending through and beyond the apertures of the members, the mandrel comprising a stem having an outer diameter substantially equal to the diameter of the bore, and a radially enlarged head which in use sets the rivet and joins the adjacent members by forming a blind head to the shell disposed against another of said apertured members, the head having a plurality of depressions, the bases of which lie on a notional circle having a diameter which is less than the stem of the mandrel and which define protrusions extending radially beyond the bore of the shell defining a maximum out diameter of the head which is adapted to be drawn through the shell, whereupon the protrusions cut into the bore of the tubular shell and displace metal into the depressions thus effectively locking the mandrel in place except in the direction of travel.

* * * * *

UNITED STATES PATENT AND TRADEMARK OFFICE
CERTIFICATE OF CORRECTION

| | | |
|---|---|---|
| PATENT NO. | : 7,273,338 B2 | |
| APPLICATION NO. | : 11/142238 | |
| DATED | : September 25, 2007 | |
| INVENTOR(S) | : Frederick Arthur Summerlin | |

It is certified that error appears in the above-identified patent and that said Letters Patent is hereby corrected as shown below:

Column 5, Line 3, please delete first word "being".

Column 5, Line 30, please replace the word "out" with the word --outer--.

Column 6, Line 23, please replace the word "out" with the word --outer--.

Signed and Sealed this

Eighteenth Day of December, 2007

JON W. DUDAS
*Director of the United States Patent and Trademark Office*